United States Patent [19]

Fenton et al.

[11] 4,243,270
[45] Jan. 6, 1981

[54] WIRE BASKET WHEEL ASSEMBLY

[75] Inventors: Aaron J. Fenton, Pacific Palisades; E. J. O. Scott-Ellis, Rancho Palos Verdes, both of Calif.

[73] Assignee: Fenton Company, Gardena, Calif.

[21] Appl. No.: 929,832

[22] Filed: Jul. 31, 1978

[51] Int. Cl.³ .............................................. B60B 7/00
[52] U.S. Cl. .............................. 301/37 SS; 301/37 SC
[58] Field of Search ........... 301/37 R, 37 SS, 37 CM, 301/37 P, 37 SC, 37 L; D12/205

[56] References Cited

U.S. PATENT DOCUMENTS

| 2,699,360 | 1/1955 | Jenkins | 301/37 SS |
| 2,746,806 | 5/1956 | Jenkins | 301/37 SS |
| 2,767,027 | 10/1956 | Horn | 301/37 SS |
| 3,294,452 | 12/1966 | Schmidt et al. | 301/37 SS |
| 4,061,400 | 12/1977 | D'Angelo | 301/37 SS |
| 4,179,163 | 12/1979 | Brown . | |

Primary Examiner—H. Grant Skaggs
Attorney, Agent, or Firm—Albert M. Herzig; Edward C. Walsh

[57] ABSTRACT

A wire basket assembly for use with simulated wire wheels. A circular wire frame having generally radial wire members simulating a wire wheel and having a central opening is provided to fit over the outer end of a sub cap of a wheel. The frame forms a basket which encloses the inner part of the wheel, including the stud bolt openings. Included with the wire frame is a central polished cup member which covers the bolt holes of the wheel. The wire frame member has inner members which are attachable to the cup member which fits over the hub of the wheel. The frame member and cup member are secured to the hub of the wheel and preferably by the outer cap and cap screw. The assembly results in a desired improved appearance and direct simulation of the wire wheel with the attaching stud bolts covered by the polished cup member.

3 Claims, 6 Drawing Figures

U.S. Patent  Jan. 6, 1981  Sheet 1 of 2  4,243,270
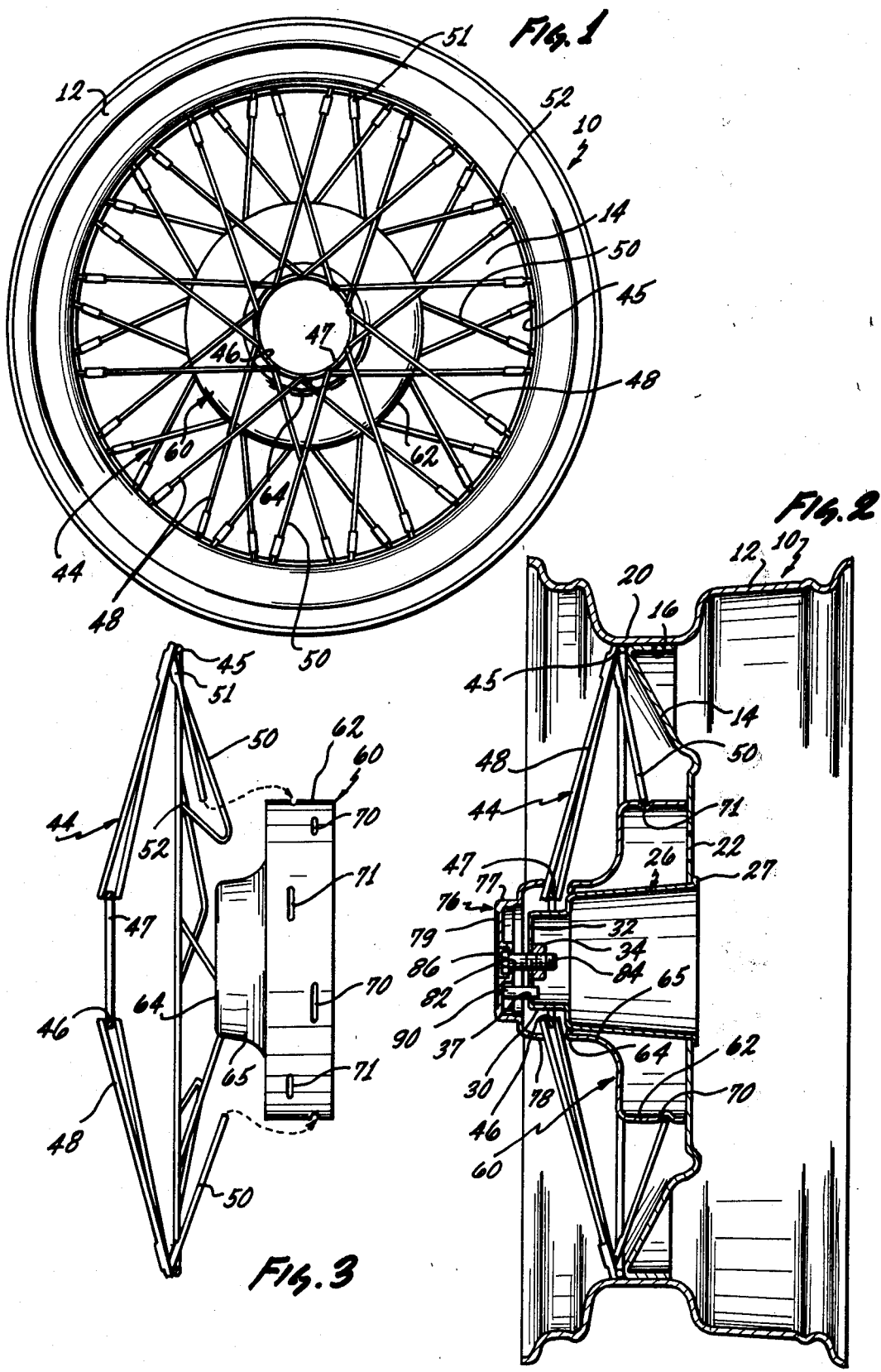

WIRE BASKET WHEEL ASSEMBLY

BACKGROUND OF THE INVENTION

1. Field of the Invention

The field of the invention is that of wire basket wheels, that is, simulated wire wheels, and more particularly to improvements in the wire basket assembly, which is attachable to the wheel in a position over the stud bolt openings.

2. Description of the Prior Art

Simulated wire wheels or wire basket wheels are known in the art. Prior art patents include U.S. Pat. Nos. 2,727,790; 3,965,708; 3,967,855; and British Pat. No. 327,315 and Canadian Pat. No. 603,736. In these constructions a circular wire frame or basket constructed of wire members is provided which is secured to the wheel over the stud bolt openings. Prior known constructions have been lacking in achieving an appearance as particularly desired in this type of wheel construction. In particular, the known constructions were deficient in their purpose in that the stud bolts for fastening the wheel to the brake drum were visible through the wire basket. The herein invention as described in detail hereinafter seeks to overcome the aforestated drawbacks.

SUMMARY OF THE INVENTION

Preferred exemplary forms of the invention are described in detail hereinafter.

In the preferred form and best mode of practice of the invention, a circular wire frame is provided having wire members simulating a wire wheel, the frame having a central opening and being of a size to fit against the inner diaphragm or disc part of a wheel. Additionally, a polished cup member is provided which can fit over the hub of the wheel in a position to cover up the stud bolt openings.

Preferably, the wire frame member has inner wire members in a pattern providing a central opening which can fit over a part of the polished cup member for holding the cup member in position. In another form of the invention, a construction is provided wherein there is a snap fit, as between the inner parts of the wire frame member and the cup member. The frame is held by an outer cap secured by a cap screw to an inner cap, the frame having a part that exerts pressure on the cup member holding it in place.

In the light of the foregoing, the primary object of the invention is to realize an improved construction of wire baskets for wire basket wheels wherein there is included a central cup member in a position to cover the stud bolt openings of the wheel, whereby a resultant improved construction and desirable aesthetic appearance is realized.

A further object is to realize a construction as in the foregoing wherein the cup member is constructed to fit over the wheel hub and the frame member is constructed to have an inner part engageable with the cup member.

A further object is to realize a construction as in the foregoing wherein there is a snap fit provided, as between the inner part of the frame member and the cup member.

Further objects and additional advantages of the invention will become apparent from the following detailed description and annexed drawings.

BRIEF DESCRIPTION OF THE DRAWINGS

FIG. 1 is a plan view of the preferred form of the invention;

FIG. 2 is a sectional view of a wheel having the invention embodied therein;

FIG. 3 is an elevational view of the form of the invention of FIGS. 1 and 2;

DESCRIPTION OF THE PREFERRED FORM OF THE INVENTION

Figure 4:
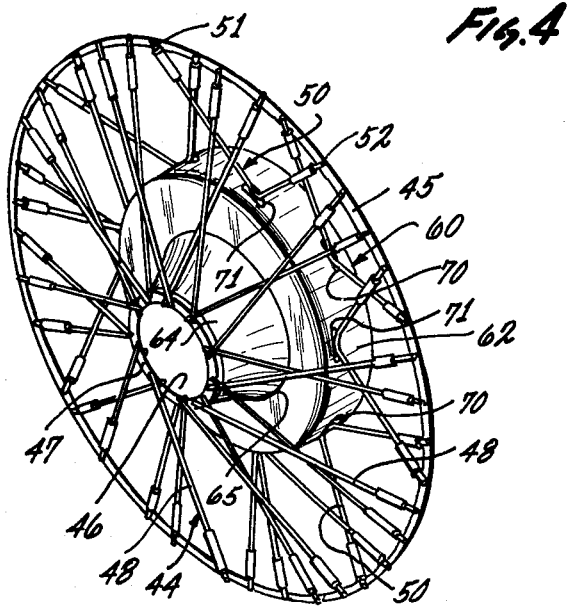
FIG. 4 is an isometric view of the form of the invention of FIGS. 1, 2 and 3.

Referring now more in detail to the various figures of the drawings, numeral 10 in FIGS. 1-4 designates a wheel having a rim part 12 which has a cross-sectional contour, as shown in FIG. 2, adapted to have a tire mounted thereon. The wheel has a central disc or diaphragm part 14 having a peripheral flange 16 which is secured to an intermediate cylindrical part 20 of the rim by any suitable means, such as welding or otherwise.

The disc or diaphragm part 14 of the wheel has a central part having a ring of bolt holes, one of which is designated at 22 adapted to receive stud bolts cooperable with nuts whereby the wheel may be secured to the brake drum of a vehicle. Numeral 26 designates a base cap or hub enclosure which is cylindrical and the end part of which as designated at 27 is secured to a central opening in the disc part 14 of the wheel, as illustrated in FIG. 2. The outer end of the base cap 26 is of smaller diameter as designated at 30, and on the inside of the end 32 of this part is a retainer member 34 which is secured to the inside surface of the end by welding or otherwise. The end 32 has a hole in it as designated at 37 for a purpose which will be described presently.

Numeral 44 designates a circular wire frame having a peripheral wire member 45 and having a central opening 46 provided by an inner wire ring member 47, this member being of a size to fit over the outer end part 30 of base cap 26. The wire frame member has a plurality of wire members as designated at 48 which extends substantially radially so as to simulate a wire wheel. The frame has an inward taper from the outer part which fits around the end part of the base cap 26 as may be seen in FIG. 2 towards its periphery formed by the ring-shaped wire 45 which fits against the joint between the inside of the rim and the periphery of the disc or diaphragm 14 as shown. The wire frame 44 has inner members formed as a plurality of units having a V shape, as designated at 50 in FIG. 4, the legs of the V extending outwardly, their ends being secured to the ring 45 at positions as designated at 51 and 52. There are a plurality of the V-shaped units equally angularly spaced around the ring 45, these units being configurated to slant inwardly as shown.

Numeral 60 designates a polished cup member having a cylindrical part 62 and an outer smaller cylindrical part 64, the sides of which are arcuate in cross-section or contour as designated at 65. The cup member 60 is shaped to fit over the hub cap 26 and is large enough to cover the stud bolt holes 22 as shown and the stud bolts when in position.

Around the outside of the larger part 62 of the cup 60 are a plurality of equally angularly spaced but staggered recesses as designated at 70 and 71. The inner ends or bases of the V-shaped units 50 are alternately at different axial spacings from the center of the ring member 45 as may be observed in FIGS. 3 and 4. The configuration of the V-shaped units is such so that their bases are adapted to fit into the recesses 70 and 71 with a snap fit as may be observed from FIGS. 2, 3 and 4.

From the foregoing, it will be observed that the wire frame and cup 60 can be constructed as separate parts but which can be assembled together in a position as shown in FIG. 2 with the polished cup member 60 over the bolt holes and stud bolts. The cup member is on the inside of the wire frame in a position covering the stud bolt holes so that a very desirable appearance is realized when the wheel is looked at, that is, through the wires of the simulated wire wheel.

Numeral 76 designates the outer securing cap. It has an outer cylindrical part 77 and an extending skirt part 78 which in the assembly fits against the wire frame of 44 as may be seen in FIG. 2 and secures it against the wheel. The outer cap 76 has a recessed face 79 which has a hole 82 of a size to receive the shank 84 of a securing member in the form of a cap screw 86 which preferably may have an octagonal head. Extending inwardly from the face 79 of the outer cap is a stem 90 positioned to fit through the hole 37 in the outer end 32 of the base cap 26 for a purpose which will be described presently.

FIGS. 1 and 2 show the parts illustrated in FIG. 3 in assembled relationship. As may be seen, the wire frame 44 fits over the smaller end of the base cap 26 and its periphery fits against the inside of rim 12 of the wheel. The stud bolts on the brake drum of the wheel extend through the holes 22, and the nuts on the stud bolts are inside of the wire frame 44 and inside of the cup 60. The outer cap 76 fits against the frame 44 as shown. The cap screw 86 extends through the hole 82 in the outer cap 76 and threads into the threaded bore of fitting 34 in the end 32 of the base cap 26. The stem or pin 90 extends through the hole 37 in the end 32 of the base cap 26. The head of the cap screw 86 fits in the recess in the face 79 of the outer cap 76 so that preferably some type of socket wrench or key is required in order to unscrew it. The pin 90 held in hole 37 prevents unscrewing cup screw 86 by turning outer cap 76 since pin 90 prevents it from turning. The inner members of the frame 44 exert pressure on the cup member 60 to hold it in place.

Figure 6:
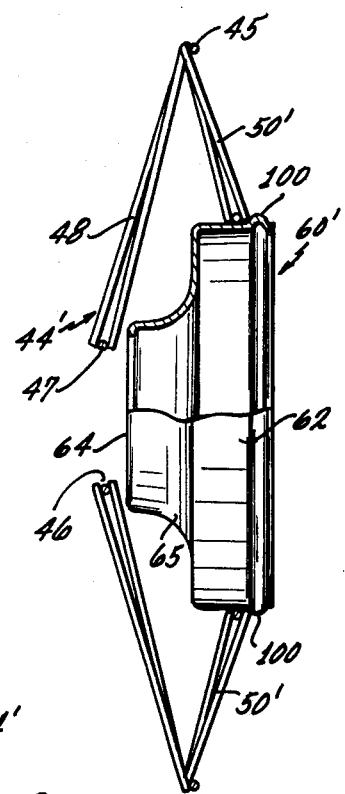
FIG. 6 is a view partly in section of the form of the invention shown in FIG. 5.
Figure 5:
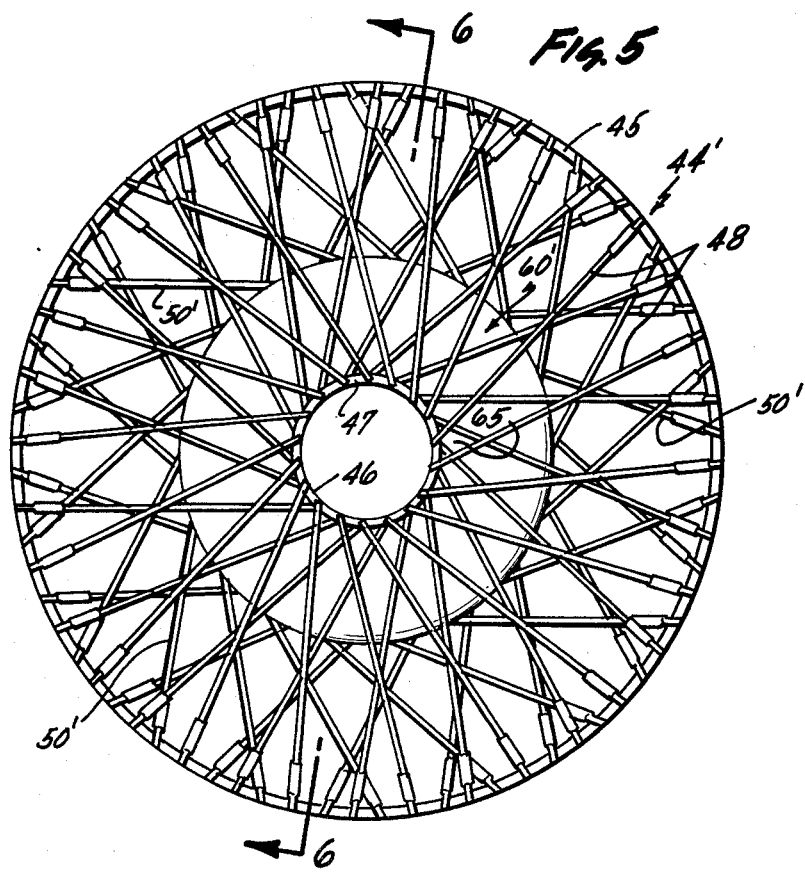
FIG. 5 is a front view of the modified form of the invention.

FIGS. 5 and 6 show a modified form of the invention wherein elements that are the same as in the previous embodiment are identified by the same reference characters, parts that represent a change or a modification being identified by similar reference characters primed. In this form of the invention, the polished cup member 65 is similar, but with the following differences. It does not have the spaced and staggered recesses 70 and 71. Instead, it has an exterior angular bead 100 at its inner edge as shown. The frame member 44' is similar, having a similar outer ring 46 and outer spoke members 48. The inner spoke members are formed of angularly spaced V-shaped wire members 50'. The bases of these V-shaped members rest against the outer surface of the part 62 of the cup member 60' as shown and against the bead 100, the parts of the assembly otherwise being held in position the same as described in connection with the previous embodiment.

From the foregoing, those skilled in the art will understand and appreciate the nature and construction of the invention and the manner in which it achieves the objectives as set forth in the foregoing. A sturdy assembly is realized in which the basket frame and the cup shaped member can be made in separate parts and then assembled and held in position with respect to the wheel. A very desirable appearance is realized in that the stud bolts are enclosed and covered by the polished cup which is on the inside of the wire frame member.

The foregoing disclosure is representative of preferred forms of the invention and is to be interpreted in an illustrative rather than a limiting sense, the invention to be afforded the full scope of the claims appended hereto.

What is claimed is:

1. As an article of manufacture, a wire basket unit adapted for use in combination with a wheel to simulate a wire wheel comprising in combination a frame having a circular peripheral wire element, an inner and smaller circular wire element, means forming a pattern of wire elements extending between the first circular element and the inner circular element, a circular cup-shaped member positioned to cover up the bolt holes of a wheel, the said cup-shaped member having a smooth outer surface, the said frame having an additional pattern of wire elements extending between the outer circular member and the periphery of the cup-shaped member for holding the cup-shaped member in position, the cup-shaped member being visible through the said frame being unobstructed by cross-laced wire elements, the said article being constructed to be adapted for use in combination with a wheel having a hub cap the said inner circular wire element of the frame being configurated to fit over the outer end of the hub cap, and means for securing the frame by way of securement to the hub cap.

2. An article as in claim 1 wherein said last means is an outer cap constructed to engage and hold the wire frame, and means securing the outer cap to the hub cap.

3. An article as in claim 2 wherein said last means is in the form of a cap screw.

* * * * *